United States Patent
Kawabata

(10) Patent No.: US 6,650,073 B2
(45) Date of Patent: Nov. 18, 2003

(54) BRUSHLESS MOTOR APPARATUS

(75) Inventor: Toru Kawabata, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 64 days.

(21) Appl. No.: 09/992,689

(22) Filed: Nov. 14, 2001

(65) Prior Publication Data

US 2002/0089302 A1 Jul. 11, 2002

(30) Foreign Application Priority Data

Nov. 15, 2000 (JP) .................................. 2000-347794

(51) Int. Cl.[7] .............................................. H02P 6/20
(52) U.S. Cl. ..................... 318/254; 318/430; 318/437
(58) Field of Search ................................ 318/138, 254, 318/439, 720–724, 430, 431, 437

(56) References Cited

U.S. PATENT DOCUMENTS

| 3,609,492 | A | * | 9/1971 | Rakes | 318/254 |
|---|---|---|---|---|---|
| 3,924,167 | A | * | 12/1975 | Clark et al. | 318/254 |
| 4,167,693 | A | * | 9/1979 | Liska et al. | 318/138 |
| 4,415,844 | A | * | 11/1983 | Mendenhall et al. | 318/254 |
| 4,435,673 | A | * | 3/1984 | Hagino et al. | 318/254 |
| 4,668,898 | A | * | 5/1987 | Harms et al. | 318/254 |
| 5,079,487 | A | * | 1/1992 | Malang | 318/254 |
| RE34,399 | E | * | 10/1993 | Gami et al. | 360/73.01 |
| 5,793,168 | A | * | 8/1998 | Vitunic | 318/254 |
| 5,936,364 | A | * | 8/1999 | Ohsawa et al. | 318/432 |
| 6,137,253 | A | * | 10/2000 | Galbiati et al. | 318/599 |

FOREIGN PATENT DOCUMENTS

JP          9-84384          3/1997

* cited by examiner

*Primary Examiner*—Bentsu Ro
(74) *Attorney, Agent, or Firm*—RatnerPrestia

(57) ABSTRACT

A brushless motor apparatus includes a motor section including delta-connected three-phase coils; a switching section electrically connected to the motor section via a line; and a driving section for controlling an ON state and an OFF state of the switching section so as to drive the motor section. In the brushless motor apparatus, $r1+r2<2R$, where $r1$ is an internal resistance of the switching section in an ON state, $r2$ is a resistance of the line connecting the motor section and the switching section, and R is a direct current resistance of each of the three-phase coils.

5 Claims, 6 Drawing Sheets

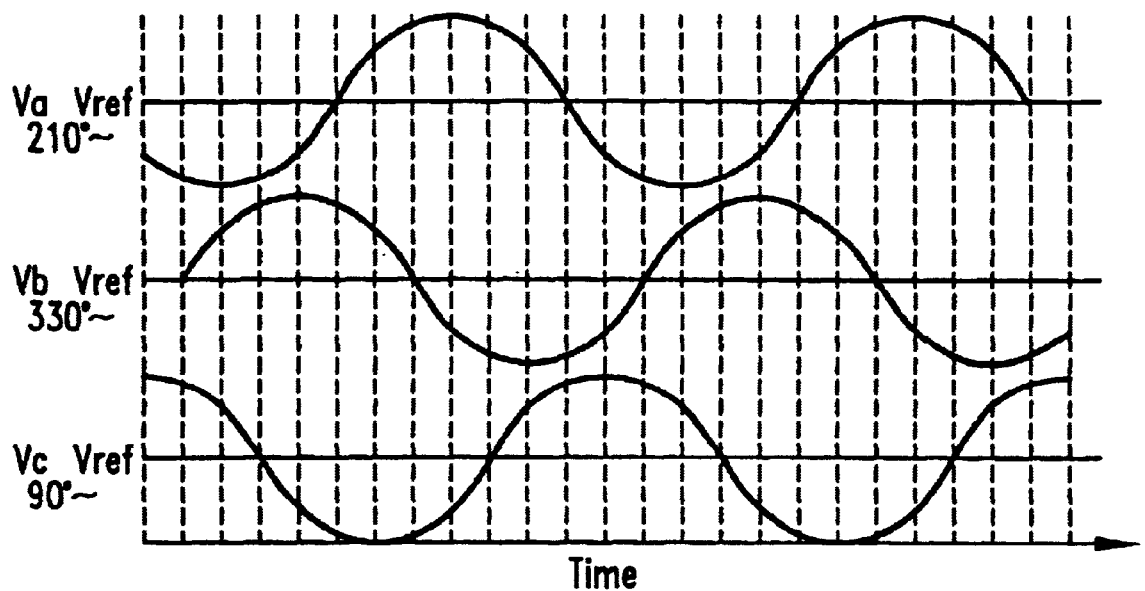

BRUSHLESS MOTOR APPARATUS

BACKGROUND OF THE INVENTION

1. Field of the Invention

The present invention relates to a brushless motor apparatus in which a driving voltage drop caused by an internal resistance of a switch and a resistance of lines is reduced.

2. Description of the Related Art

Motors are used in a variety of industrial fields. Smaller motors are used in, for example, cellular phones, tape recorders and DVD apparatuses. Larger motors having a diameter of several meters are used for, for example, rolling mills.

Motor apparatuses are available in various types including, for example, rectifier motor apparatuses, inductance motor apparatuses, and brushless motor apparatuses.

A rectifier motor apparatus includes a brush, a rectifier and a coil. Rectifier motor apparatuses, which have a simple structure and usable with DC or AC currents, are widely used in, for example, multi-purpose compact devices, electric home appliances and toys.

In an inductance motor apparatus, a motor is rotated by a current which is generated by electromagnetic inductance caused by rotation of a magnetic field. Inductance motor apparatuses are used in, for example, manufacturing machines such as rolling mills for steel, paper and the like.

A brushless motor apparatus includes a motor rectifying mechanism using a sensor or dedicated IC, instead of a mechanical sliding member such as a brush, a rectifier and the like, unlike a rectifier motor apparatus. The brushless motor apparatus, which does not include a brush or a rectifier, naturally does not cause contact and thus does not cause friction between a motor with the brush or rectifier. Therefore, the brushless motor apparatus has a longer life than other types of motor apparatuses and does not suffer from the inconvenience of metal or carbon powder being scattered. Brushless motors are used in, for example, hard disc drives and CD-ROM drives of personal computers, and air cooling fans.

A brushless motor apparatus including three-phase coils connected in a Y or star shape (Y-connection three-phase brushless motor) is conventionally known. However, there is no brushless motor apparatus existing having three-phase coils connected in a delta shape (delta-connection three-phase brushless motor), since the delta connection is mostly used for rectifier motors and induction motor apparatuses.

SUMMARY OF THE INVENTION

A brushless motor apparatus according to the present invention includes a motor section including delta-connected three-phase coils; a switching section electrically connected to the motor section by a line; and a driving section for controlling an ON state and an OFF state of the switching section so as to drive the motor section. r1+r2<2R, where r1 is an internal resistance of the switching section in an ON state, r2 is a resistance of the line connecting the motor section and the switching section, and R is a direct current resistance of each of the three-phase coils.

In one embodiment of the invention, the driving section controls a ratio between a time period in which the switching section is in the ON state and a time period in which the switching section is in the OFF state to be variable.

In one embodiment of the invention, the motor section includes a rotor rotatable about an axis thereof. The driving section controls the ON state and the OFF state of the switching section so that the switching section outputs a sine wave current in accordance with a rotation angle of the rotor.

In one embodiment of the invention, the motor section and the switching section are integrally structured.

In one embodiment of the invention, the motor section further includes a magnetic flux detection section for detecting a magnetic flux generated by the rotor. The magnetic flux detection section is provided at a position at which magnetic fluxes generated by two adjacent coils among the three-phase coils counteract each other.

In one embodiment of the invention, the motor section further includes a magnetic flux detection section for detecting a magnetic flux generated by the rotor. The driving section controls the ON state and the OFF state of the switching section so that a difference between a phase of the sine wave current and a phase of the rotation angle of the rotor detected by the magnetic flux detection section is maintained.

In one embodiment of the invention, the motor section further includes a magnetic flux detection section for detecting a magnetic flux generated by the rotor. The driving section controls the ON state and the OFF state of the switching section so that a difference between a phase of the sine wave current and a phase of the rotation angle of the rotor detected by the magnetic flux detection section is variable.

Thus, the invention described herein makes possible the advantages of providing a delta-connection three-phase brushless motor having superior characteristics to those of the conventional Y-connection three-phase brushless motor.

These and other advantages of the present invention will become apparent to those skilled in the art upon reading and understanding the following detailed description with reference to the accompanying figures.

BRIEF DESCRIPTION OF THE DRAWINGS

FIG. 3C is a graph illustrating voltages Va, Vb and Vc respectively applied to first-phase coil 114a, second-phase coil 114b, and third-phase coil 114c of the stator coil section 114 included in the brushless motor apparatus 100 shown in FIG. 1;

DESCRIPTION OF THE EMBODIMENTS

Hereinafter, the present invention will be described by way of illustrative examples with reference to the accompanying drawings.

With reference to FIGS. 1, 2, 3A through 3C and 4A through 4C, a brushless motor apparatus 100 according to one example of the present invention will be described.

1. Structure of the Brushless Motor Apparatus 100

Figure 1:
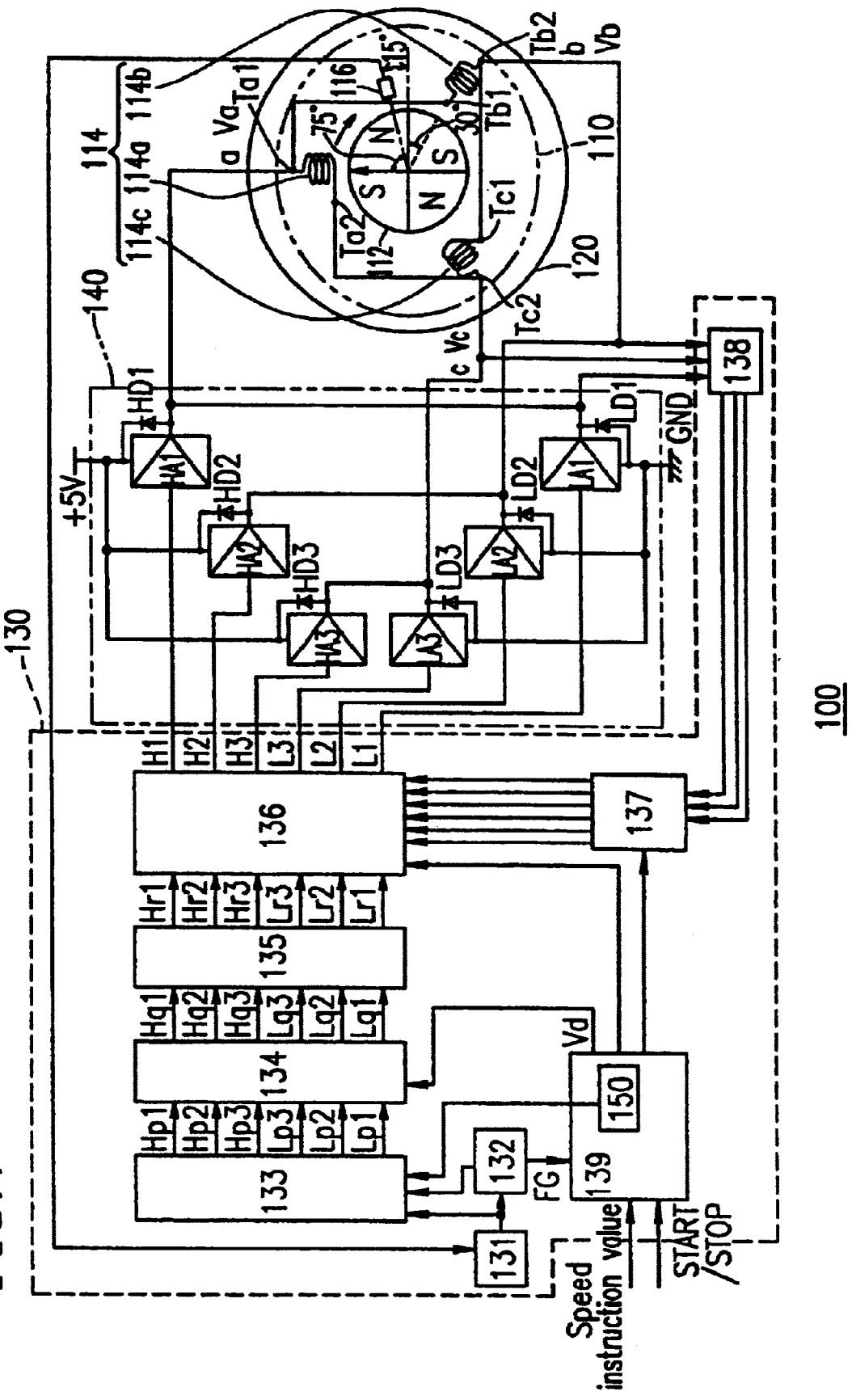
FIG. 1 is a diagram illustrating a structure of a brushless motor apparatus 100 according to one example of the present invention.

FIG. 1 shows a structure of the brushless motor apparatus 100.

The brushless motor apparatus 100 includes a brushless motor (motor section) 110 including a stator coil section 114, a switching section 140 electrically connected to the brushless motor 110 via lines, and a driving section 130 for controlling the ON/OFF state of the switching section 140 so as to drive the brushless motor 110. As described below in detail, the stator coil section 114 includes three-phase coils 114a (first-phase coil), 114b (second-phase coil) and 114c (third-phase coil) which are connected in a delta shape.

The brushless motor 110 includes a rotor 112 rotatable about an axis thereof, the stator coil section 114, and a hall element (magnetic flux detection section) 116 for detecting a magnetic flux generated by the rotor 112. The three-phase coils 114a, 114b and 114c are provided at fixed positions with respect to the rotor 112.

The rotor 112 is a magnetic member and will be referred to as a "rotor magnet 112" hereinafter. In the example shown in FIG. 1, the rotor magnet 112 is a 4-pole-magnetized magnet. However, the number of poles of the rotor magnet 112 is not limited to four, and the rotor magnet 112 may be, for example, a 12-pole-magnetized magnet.

A first terminal Ta1 of the first-phase coil 114a is electrically connected to a first terminal Tb1 of the second-phase coil 114b. A second terminal Tb2 of the second-phase coil 114b is electrically connected to a first terminal Tc1 of the third-phase coil 114c. A second terminal Tc2 of the third-phase coil 114c is electrically connected to a second terminal Ta2 of the first-phase coil 114a. Thus, the first-phase coil 114a, the second-phase coil 114b and the third-phase coil 114c are connected in a delta shape.

In the example shown in FIG. 1, the stator coil section 114 is a 3-pole three-phase stator coil. However, the number of the poles is not limited to three, and the stator coil section 114 may be, for example, a 9-pole three-phase stator coil section.

The hall element 116 detects a magnetic flux generated by the rotor magnet 112. Based on the detected magnetic flux, the hall element 116 outputs a sine wave signal in accordance with the rotation angle of the rotor magnet 112. The output signal is input to a hall amplifier/level slicing section 131 in the driving section 130.

In FIG. 1, the hall element 116 is provided at a position which is 45 degrees away from the second-phase coil 114b towards the first-phase coil 114a (45 degrees=30 degrees between the second-phase coil 114b and the one-dot chain line+15 degrees between the one-dot chain line and the first-phase coil 114a). This position is also 75 degrees away from the first-phase coil 114a towards the second-phase coil 114b.

The switching section 140 includes three upper switching elements HA1, HA2 and HA3, three lower switching elements LA1, LA2 and LA3, three upper diodes HD1, HD2 and HD3, and three lower diodes LD1, LD2 and LD3.

The switching elements HA1, LA1, HA2, LA2, HA3 and LA3 are respectively driven based on output signals H1, L1, H2, L2, H3 and L3 generated by the driving section 130 as described below.

The driving section 130 controls a current flowing from a power supply having a voltage of 5 V to each of the three-phase coils 114a, 114b and 114c of the stator coil section 114 by controlling the ON/OFF state of each of the switching elements HA1, LA1, HA2, LA2, HA3 and LA3 of the switching section 140.

The driving section 130 includes the hall amplifier/level slicing section 131, a pulse interval measurement section 132, a sine wave table storage section 133, a multiplier 134, a Data-Duty conversion section 135, a driving circuit 136, a starting section 137, a counterelectromotive voltage detection section 138 and a control section 139.

The hall amplifier/level slicing section 131 amplifies an output signal from the hall element 116 and then generates a level sliced pulse signal based on the amplified output signal. The level sliced pulse signal is output from the hall amplifier/level slicing section 131 and input to the pulse interval measurement section 132 and to the sine wave table storage section 133.

The pulse interval measurement section 132 measures a time interval between a rise of one pulse and a rise of the next pulse of the level sliced pulse signal output from the hall amplifier/level slicing section 131. Then, the pulse interval measurement section 132 outputs digital measurement data, which represents the time period obtained by the measurement, to the sine wave table storage section 133. The pulse interval measurement section 132 also generates a rotation speed signal FG, which represents an actual rotation speed of the brushless motor 110, based on the level sliced pulse signal which is output from the hall amplifier/level slicing section 131. Then, the pulse interval measurement section 132 outputs the generated rotation speed signal FG to the control section 139.

The sine wave table storage section 133 has a table stored therein which represents sine values respectively corresponding to angles of sine waves. Table 1 shows the data included in the table.

TABLE 1

| Data number | Phase | Sine value H | Sine value L | Data number | Phase | Sine value H | Sine value L |
|---|---|---|---|---|---|---|---|
| 0 | 0 | 0 | 0 | 64 | 180 | 0 | 0 |
| 1 | 2.8125 | 12 | 0 | 65 | 182.8125 | 0 | 13 |
| 2 | 5.625 | 24 | 0 | 66 | 185.625 | 0 | 25 |
| 3 | 8.4375 | 37 | 0 | 67 | 188.4375 | 0 | 38 |
| 4 | 11.25 | 49 | 0 | 68 | 191.25 | 0 | 50 |
| 5 | 14.0625 | 61 | 0 | 69 | 194.0625 | 0 | 62 |
| 6 | 16.875 | 74 | 0 | 70 | 196.875 | 0 | 74 |
| 7 | 19.6875 | 85 | 0 | 71 | 199.6875 | 0 | 86 |
| 8 | 22.5 | 97 | 0 | 72 | 202.5 | 0 | 98 |
| 9 | 25.3125 | 109 | 0 | 73 | 205.3125 | 0 | 109 |
| 10 | 28.125 | 120 | 0 | 74 | 208.125 | 0 | 121 |
| 11 | 30.9375 | 131 | 0 | 75 | 210.9375 | 0 | 131 |
| 12 | 33.75 | 141 | 0 | 76 | 213.75 | 0 | 142 |
| 13 | 36.5625 | 151 | 0 | 77 | 216.5625 | 0 | 152 |
| 14 | 39.375 | 161 | 0 | 78 | 219.375 | 0 | 162 |
| 15 | 42.1875 | 171 | 0 | 79 | 222.1875 | 0 | 172 |
| 16 | 45 | 180 | 0 | 80 | 225 | 0 | 181 |
| 17 | 47.8125 | 188 | 0 | 81 | 227.8125 | 0 | 189 |
| 18 | 50.625 | 197 | 0 | 82 | 230.625 | 0 | 197 |
| 19 | 53.4375 | 204 | 0 | 83 | 233.4375 | 0 | 205 |
| 20 | 56.25 | 211 | 0 | 84 | 236.25 | 0 | 212 |
| 21 | 59.0625 | 218 | 0 | 85 | 239.0625 | 0 | 219 |
| 22 | 61.875 | 224 | 0 | 86 | 241.875 | 0 | 225 |
| 23 | 64.6875 | 230 | 0 | 87 | 244.6875 | 0 | 231 |
| 24 | 67.5 | 235 | 0 | 88 | 247.5 | 0 | 236 |
| 25 | 70.3125 | 240 | 0 | 89 | 250.3125 | 0 | 241 |
| 26 | 73.125 | 244 | 0 | 90 | 253.125 | 0 | 244 |
| 27 | 75.9375 | 247 | 0 | 91 | 255.9375 | 0 | 248 |
| 28 | 78.75 | 250 | 0 | 92 | 258.75 | 0 | 251 |
| 29 | 81.5625 | 252 | 0 | 93 | 261.5625 | 0 | 253 |

TABLE 1-continued

| Data number | Phase | Sine value H | L | Data number | Phase | Sine value H | L |
|---|---|---|---|---|---|---|---|
| 30 | 84.375 | 253 | 0 | 94 | 264.375 | 0 | 254 |
| 31 | 87.1875 | 254 | 0 | 95 | 267.1875 | 0 | 255 |
| 32 | 90 | 254 | 0 | 96 | 270 | 0 | 255 |
| 33 | 92.8125 | 254 | 0 | 97 | 272.8125 | 0 | 255 |
| 34 | 95.625 | 253 | 0 | 98 | 275.625 | 0 | 254 |
| 35 | 98.4375 | 252 | 0 | 99 | 278.4375 | 0 | 253 |
| 36 | 101.25 | 250 | 0 | 100 | 281.25 | 0 | 251 |
| 37 | 104.0625 | 247 | 0 | 101 | 284.0625 | 0 | 248 |
| 38 | 106.875 | 244 | 0 | 102 | 286.875 | 0 | 245 |
| 39 | 109.6875 | 240 | 0 | 103 | 289.6875 | 0 | 241 |
| 40 | 112.5 | 235 | 0 | 104 | 292.5 | 0 | 236 |
| 41 | 115.3125 | 230 | 0 | 105 | 295.3125 | 0 | 231 |
| 42 | 118.125 | 224 | 0 | 106 | 298.125 | 0 | 226 |
| 43 | 120.9375 | 218 | 0 | 107 | 300.9375 | 0 | 219 |
| 44 | 123.75 | 212 | 0 | 108 | 303.75 | 0 | 213 |
| 45 | 126.5625 | 204 | 0 | 109 | 306.5625 | 0 | 205 |
| 46 | 129.375 | 197 | 0 | 110 | 309.375 | 0 | 198 |
| 47 | 132.1875 | 189 | 0 | 111 | 312.1875 | 0 | 190 |
| 48 | 135 | 180 | 0 | 112 | 315 | 0 | 181 |
| 49 | 137.8125 | 171 | 0 | 113 | 317.8125 | 0 | 172 |
| 50 | 140.625 | 161 | 0 | 114 | 320.625 | 0 | 162 |
| 51 | 143.4375 | 152 | 0 | 115 | 323.4375 | 0 | 153 |
| 52 | 146.25 | 141 | 0 | 116 | 326.25 | 0 | 142 |
| 53 | 149.0625 | 131 | 0 | 117 | 329.0625 | 0 | 132 |
| 54 | 151.875 | 120 | 0 | 118 | 331.875 | 0 | 121 |
| 55 | 154.6875 | 109 | 0 | 119 | 334.6875 | 0 | 110 |
| 56 | 157.5 | 97 | 0 | 120 | 337.5 | 0 | 98 |
| 57 | 160.3125 | 86 | 0 | 121 | 340.3125 | 0 | 87 |
| 58 | 163.125 | 74 | 0 | 122 | 343.125 | 0 | 75 |
| 59 | 165.9375 | 62 | 0 | 123 | 345.9375 | 0 | 63 |
| 60 | 168.75 | 49 | 0 | 124 | 348.75 | 0 | 51 |
| 61 | 171.5625 | 37 | 0 | 125 | 351.5625 | 0 | 38 |
| 62 | 174.375 | 25 | 0 | 126 | 354.375 | 0 | 26 |
| 63 | 177.1875 | 12 | 0 | 127 | 357.1875 | 0 | 13 |

In Table 1, the "phase" represents angles obtained by equally dividing 360 degrees by 128. The "sine value" corresponding to each "phase" is shown with 8-bit values (0 to 255). The 128 sine values in Table 1 respectively have data numbers of 0 through 127. Two sine values (H system value and L system value) are provided for each data number.

For example, the sine wave having data number 32 has a phase of 90 degrees, an H system sine value of 254, and an L system sine value of 0. The sine wave having data number 96 has a phase of 270 degrees, an H system sine value of 0, and an L system sine value of 255.

Figure 2:
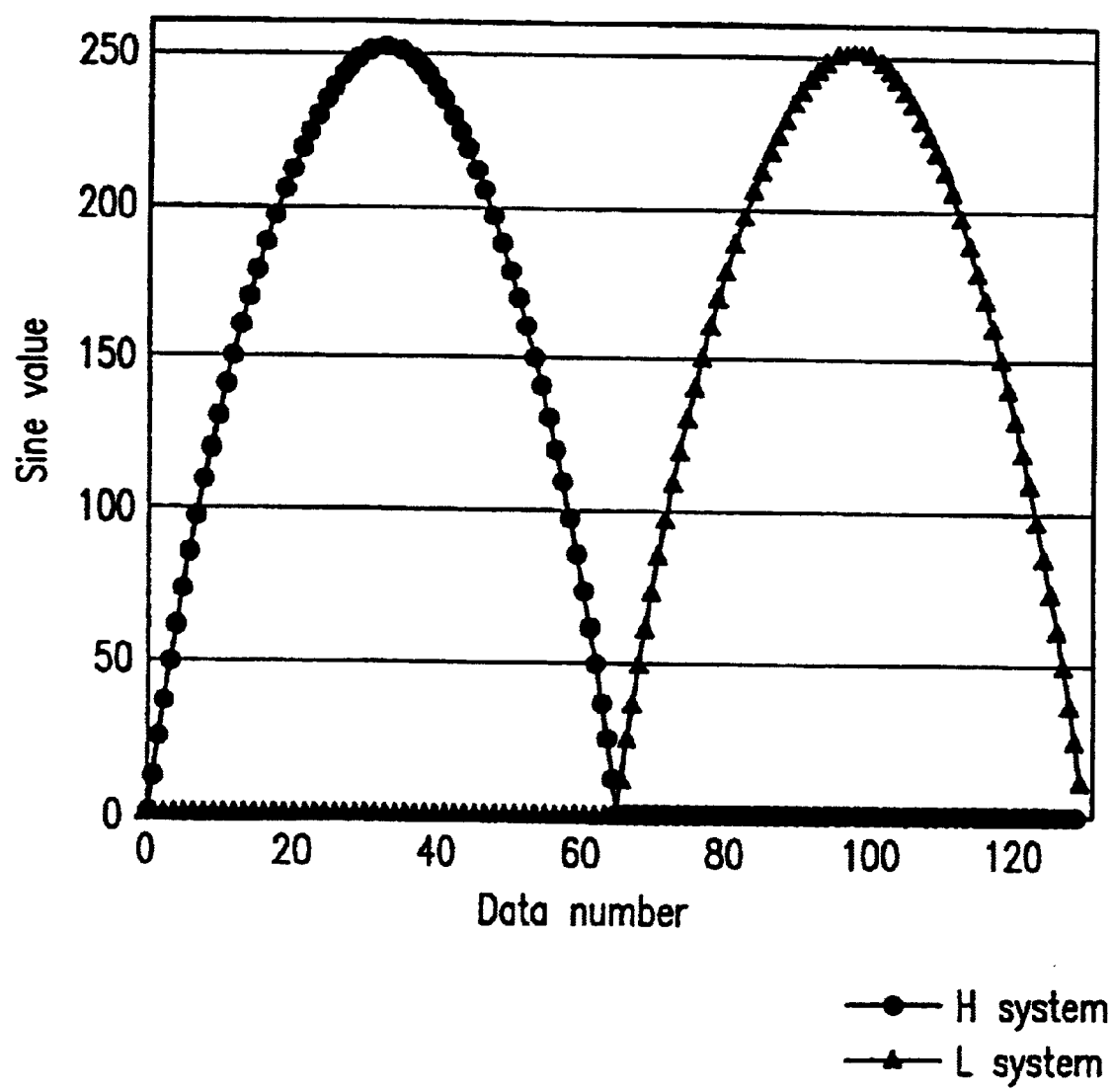
FIG. 2 shows data in a table stored in a sine wave table storage section 133 included in the brushless motor apparatus 100 shown in FIG. 1.

FIG. 2 is a graph illustrating the values in Table 1, i.e., the data stored in the sine wave table storage section 133. The vertical axis represents the sine value, and the horizontal axis represents the data number. The H system values are plotted with "●", and the L system values are plotted with "▲".

In the case of the data numbers 0 through 63 (the phases of the sine wave of 0 degrees to 180 degrees), the H system values correspond to the phases of the sine wave, and the L system values are 0.

In the case of the data numbers 64 through 127 (the phases of the sine wave of 180 degrees to 360 degrees), the H system values are 0, and the L system values are absolute values of values corresponding to the phases of the sine wave.

The sine wave table storage section 133 reads the values in the table in accordance with the rise of the level sliced pulse signal which is output from the hall amplifier/level slicing section 131. The sine wave table storage section 133 also reads the data for the 128 data numbers, which match one cycle of sine wave, at the same interval as the interval at which the pulse interval measurement section 132 outputs digital measurement data. The sine wave table storage section 133 starts reading from three different data numbers, so as to output six signals Hp1, Lp1, Hp2, Lp2, Hp3 and Lp3 in total. The output signal Hp1 of the H system and the output signal Lp1 of the L system correspond to the same data number as each other. The output signal Hp2 of the H system and the output signal Lp2 of the L system correspond to the same data number as each other. The output signal Hp3 of the H system and the output signal Lp3 of the L system correspond to the same data number as each other.

Figure 3A:
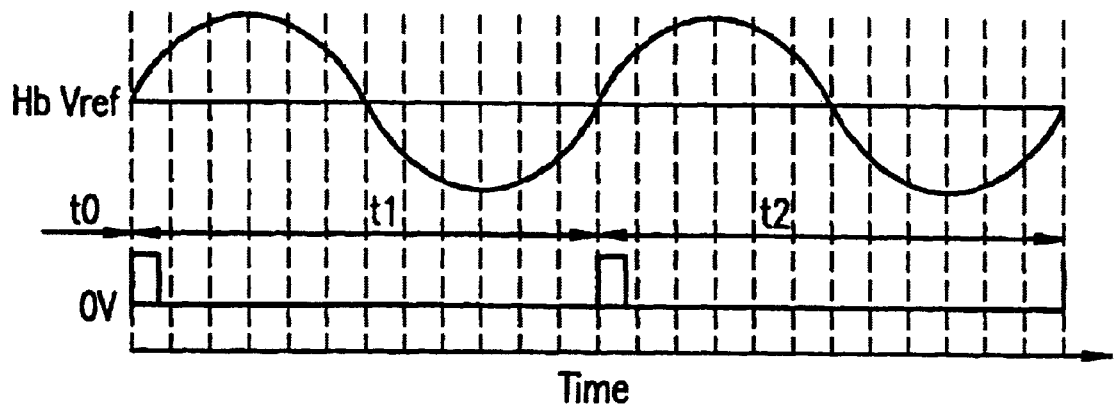
FIG. 3A is a graph illustrating a sine wave signal output from a hall element 116 and a level sliced pulse signal output from a hall amplifier/level slicing section 131 both included in the brushless motor apparatus 100 shown in FIG. 1.

FIG. 3A is a graph illustrating the sine wave signal output from the hall element 116 and the level sliced pulse signal from the hall amplifier/level slicing section 131. The vertical axis represents the level of the signal or pulse, and the horizontal axis represents the time. The output pulse from the hall amplifier/level slicing section 131 rises when the sine wave signal from the hall element 116 changes from a negative level to a positive level.

The pulse interval measurement section 132 measures a time interval between the rise of one pulse and the rise of the next pulse of the level sliced pulse signal output from the hall amplifier/level slicing section 131, and generates time data t0, t1, t2, . . . .

Figure 3B:
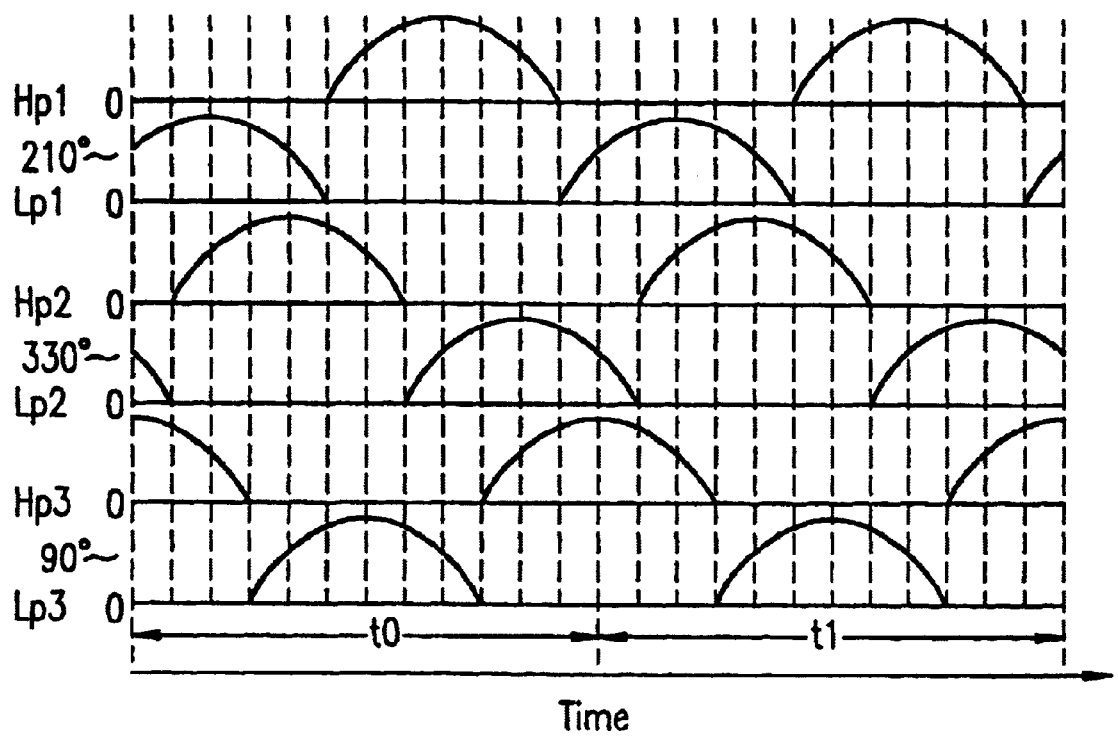
FIG. 3B is a graph illustrating output signals Hp1, Lp1, Hp2, Lp2, Hp3 and Lp3 which are output from the sine wave table storage section 133.

FIG. 3B is a graph illustrating the output signals Hp1, Lp1, Hp2, Lp2, Hp3 and Lp3 from the sine wave table storage section 133. The vertical axis represents the level of the signal, and the horizontal axis represents the time.

Upon receiving the pulse from the hall amplifier/level slicing section 131, the sine wave table storage section 133 starts reading the H system values from the value of data number 75 in the table. The read H system values are output to the multiplier 134 as the signals Hp1. After outputting the H system value of data number 127, the H system value of data number 0 is output again. Then, the H system values of 12 (data number 1), 24 (data number 2), 37 (data number 3), . . . are output as the signals Hp1.

The speed of data reading is controlled by the speed at which the hall amplifier/level slicing section 131 outputs the pulse at the time interval t0. When the next pulse is output from the hall amplifier/level slicing section 131 while the sine wave table storage section 133 reads the values, the sine wave table storage section 133 returns to data number 75 and starts reading the values from data number 75. Then, the speed of data reading is controlled by the speed at which the hall amplifier/level slicing section 131 outputs the pulse at the time interval t1.

In a similar manner, the sine wave table storage section 133 starts reading the L system values from the value of data number 75 in the table. The L system values are output to the multiplier 134 as the signal Lp1.

In a similar manner, the sine wave table storage section 133 starts reading the H system values from the value of data number 117 in the table. The H system values are output to the multiplier 134 as the signals Hp2.

In a similar manner, the sine wave table storage section 133 starts reading the L system values from the value of data number 117 in the table. The L system values are output to the multiplier 134 as the signal Lp2.

In a similar manner, the sine wave table storage section 133 starts reading the H system values from the value of data number 32 in the table. The H system values are output to the multiplier 134 as the signals Hp3.

In a similar manner, the sine wave table storage section 133 starts reading the L system values from the value of data number 32 in the table. The L system values are output to the multiplier 134 as the signal Lp3.

FIG. 3C is a graph illustrating voltages Va, Vb and Vc respectively applied to the first-phase coil 114a, the second-phase coil 114b, and the third-phase coil 114c.

The voltages Va, Vb and Vc have the same frequency as that of the output signal from the hall element 116, and have a predetermined phase relationship with each other.

The multiplier 134 multiplies a voltage instruction value Vd which is output from the control section 139 by each of the levels of the output signals Hp1, Lp1, Hp2, Lp2, Hp3 and Lp3 output from the sine wave table storage section 133, so as to generate output signals Hq1, Lq1, Hq2, Lq2, Hq3 and Lq3.

The voltage instruction value Vd represents the level of the value instructed by the control section 139 for driving the brushless motor 110. As described below, the control section 139 outputs the voltage instruction value Vd as an 8-bit value (0 through 255). In the case where the voltage instruction value Vd is 0 V, a data value of 0 is output. In the case where the voltage instruction value Vd is 5 V, a data value of 255 is output.

The maximum possible value of each of the output signals Hp1, Lp1, Hp2, Lp2, Hp3 and Lp3 output from the sine wave table storage section 133 is 255. Accordingly, the maximum possible value of each of the output signals Hq1, Lq1, Hq2, Lq2, Hq3 and Lq3 is 255×255=65025.

The Data-Duty conversion section 135 respectively converts the output signals Hq1, Lq1, Hq2, Lq2, Hq3 and Lq3 into output signals Hr1, Lr1, Hr2, Lr2, Hr3 and Lr3, which have duty ratios in proportion to the values of the respective output signals Hq1, Lq1, Hq2, Lq2, Hq3 and Lq3. When any of the output signals Hq1, Lq1, Hq2, Lq2, Hq3 and Lq3 has the maximum value of 65025, the corresponding output signal Hq1, Lq1, Hq2, Lq2, Hq3 or Lq3 has a duty ratio of 100%. When any of the output signals Hq1, Lq1, Hq2, Lq2, Hq3 and Lq3 has the minimum value of 0, the corresponding output signal Hq1, Lq1, Hq2, Lq2, Hq3 or Lq3 has a duty ratio of 0%.

The driving circuit 136 receives the output signals Hr1, Lr1, Hr2, Lr2, Hr3 and Lr3 and generates the output signals H1, L1, H2, L2, H3 and L3. As described above, the switching elements HA1, LA1, HA2, LA2, HA3 and LA3 are respectively driven based on the output signals H1, L1, H2, L2, H3 and L3. As described below, the driving circuit 136 receives a signal also from the starting section 137. Also as described below, the driving circuit 136 receives a switching signal from the control section 139.

The counterelectromotive detection section 138 detects, for example, data on a phase of a counterelectromotive voltage generated in the stator coil section 114 and data on polarities of the first-phase coil 114a, the second-phase coil 114b, and the third-phase coil 114c, and outputs the detected data to the starting section 137.

The starting section 137 outputs an appropriate signal to the driving circuit 136 for starting the brushless motor 110, in order to rotate the rotor magnet 112. The starting section 137 receives the data from the counterelectromotive detection section 138 and outputs the data to the driving circuit 136. Based on the data output from the counterelectromotive detection section 138, the driving circuit 136 can drive the brushless motor 110 at a relatively low rotation speed.

The driving circuit 136 outputs the signals L1, L2 and L3 respectively to the lower switching elements LA1, LA2 and LA3. The driving circuit 136 also outputs the signals H1, H2 and H3 respectively to the upper switching elements HA1, HA2 and HA3. The driving circuit 136 controls the ON/OFF state of the switching section 140 to control the current flowing from the 5 V power supply to the stator coil section 114.

The upper switching elements HA1, HA2 and HA3 and the lower switching elements LA1, LA2 and LA3 are only switched completely ON or completely OFF. Accordingly, a voltage which is sufficiently high to saturate the current vs. voltage characteristic can be applied to any of the switching elements HA1, HA2, HA3, LA1, LA2 and LA3 which is in an ON state.

The switching section 140 and the brushless motor 110 may be integrally structured. In such a case, the resistance of the lines between the switching section 140 and the stator coil section 114 of the brushless motor 110 can be reduced.

The control section 139 receives a speed instruction value, the rotation speed signal FG, and START and STOP signals. The control section 139 outputs the switching signal to the driving circuit 136 and the starting section 137 for driving the brushless motor 110. When it is detected that the rotation of the brushless motor 110 has reached a predetermined speed based on the rotation speed signal FG, the control section 139 switches the driving circuit 136 to a normal driving mode. The control section 139 also compares the speed instruction value and the value of the rotation speed signal FG, and outputs a value in proportion to the difference between the two values as the voltage instruction value Vd. The rotation speed of the brushless motor 110 is controlled to match the speed instruction value.

2. Operation of the Brushless Motor Apparatus 100

Hereinafter, an exemplary operation of the brushless motor 100 will be described. The brushless motor apparatus 100 is used in, for example, an optical disc recording and reproduction apparatus.

When a START signal is input to the control section 139, the control section 139 outputs a switching signal to the driving circuit 136 and the starting section 137. The starting section 137 outputs an appropriate signal to the driving circuit 136 so as to control the switching section 140, thereby rotating the rotor magnet 112. Thus, the brushless motor 110 is placed into a driving state.

When detecting that the rotor magnet 112 is rotated based on the rotation speed signal FG, the control section 139 outputs a switching signal to the starting section 137. The starting section 137 receives the data on a phase of a counterelectromotive voltage generated in the stator coil section 114 and data on polarities of the first-phase coil 114a, the second-phase coil 114b, and the third-phase coil 114c from the counterelectromotive voltage detection section 138, and generates a signal based on the data. The generated signal is output to the driving circuit 136. The driving circuit 136 drives the brushless motor 110 at a relatively low speed by controlling the switching section 140. When the rotation speed of the brushless motor 110 reaches a predetermined speed, the driving circuit 136 is placed into a normal driving mode, and drives the brushless motor 110 based on the output signals Hr1, Lr1, Hr2, Lr2, Hr3 and Lr3.

Since the brushless motor 110 already rotates at a predetermined rotation speed or higher, the hall element 116 outputs a stable signal. The hall amplifier/level slicing section 131 outputs a level sliced pulse signal. The pulse interval measurement section 132 measures an interval between the rise of one pulse and the rise of the next pulse of the level sliced pulse signal output from the hall amplifier/level slicing section 131, and outputs the digital measurement data. The digital measurement data is input to the sine wave table storage section 133, which outputs the output signals Hp1, Lp1, Hp2, Lp2, Hp3 and Lp3.

The sine wave table storage section 133 starts reading at the rise of the level sliced pulse signal which is output from the hall amplifier/level slicing section 131 and reads the data for the 128 data numbers at the same interval as the interval at which the pulse interval measurement section 132 outputs digital measurement data. Accordingly, while the brushless motor 110 rotates at a predetermined speed, the cycle of the output signal from the hall element 116 matches the cycle of the data read from the sine wave table storage section 133. The phase of the output signal from the hall element 116 and the phase of the data read from the sine wave table storage section 133 maintain the predetermined relationship.

The digital measurement data from the pulse interval measurement section 132 represents the time period of a rise portion of the level sliced pulse signal output from the hall amplifier/level slicing section 131 of an immediately previous cycle. Accordingly, while the rotation of the brushless motor 110 accelerates or decelerates, the cycle of the output signal from the hall element 116 does not match the cycle of the data read from the sine wave table storage section 133. Neither is the predetermined relationship between the phase of the output signal from the hall element 116 and the phase of the data read from the sine wave table storage section 133 maintained.

In a brushless motor apparatus including a 12-pole-magnetized rotor magnet and 9-pole three-phase stator coils, the cycle of the output signal from the hall element 116 corresponds to 1/6 of one rotation of the 12-pole-magnetized rotor magnet. When the 12-pole-magnetized rotor magnet is rotated at a speed of 500 rpm or greater and accelerated at a maximum torque, the cycle of the output signal from the hall element 116 is shifted by only about 10% at the maximum with respect to the cycle of the data read from the sine wave table storage section 133.

The multiplier 134 multiplies the voltage instruction value Vd output from the control section 139 by each of the levels of the output signals Hp1, Lp1, Hp2, Lp2, Hp3 and Lp3, so as to generate output signals Hq1, Lq1, Hq2, Lq2, Hq3 and Lq3 having an amplitude in proportion to the voltage instruction value Vd. The output signals Hq1, Lq1, Hq2, Lq2, Hq3 and Lq3 are input to the Data-Duty conversion section 135. The Data-Duty conversion section 135 generates output signals Hr1, Lr1, Hr2, Lr2, Hr3 and Lr3, which have duty ratios in proportion to the values of the respective output signals Hq1, Lq1, Hq2, Lq2, Hq3 and Lq3.

Figure 4A:
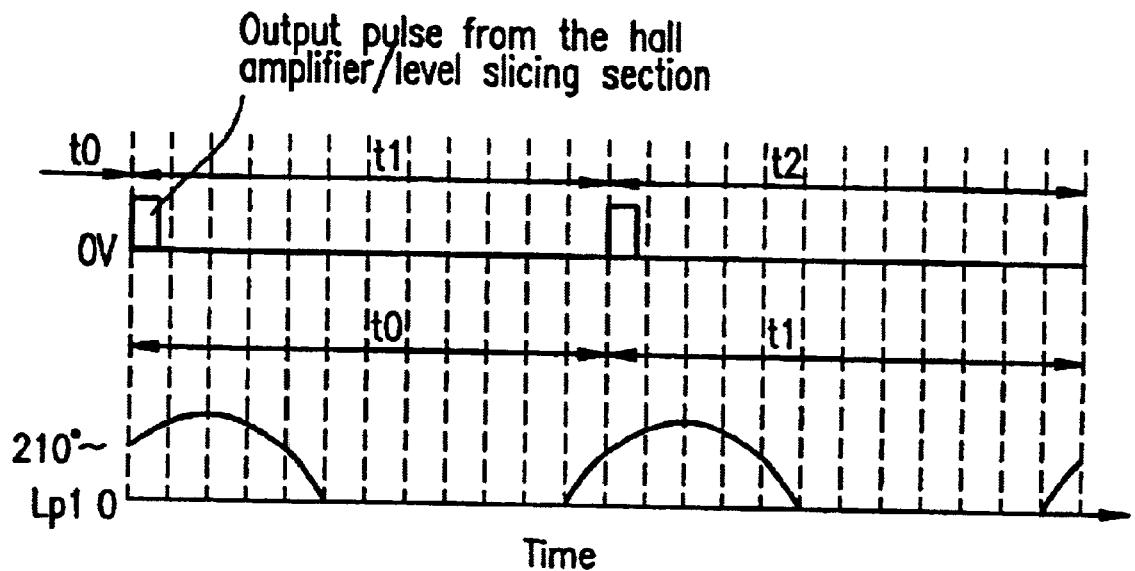
FIG. 4A is a graph illustrating a level sliced pulse signal output from the hall amplifier/level slicing section 131 and an output signal Lp1.

FIG. 4A is a graph illustrating the level sliced pulse signal output from the hall amplifier/level slicing section 131 and the output signal Lp1.

Figure 4B:
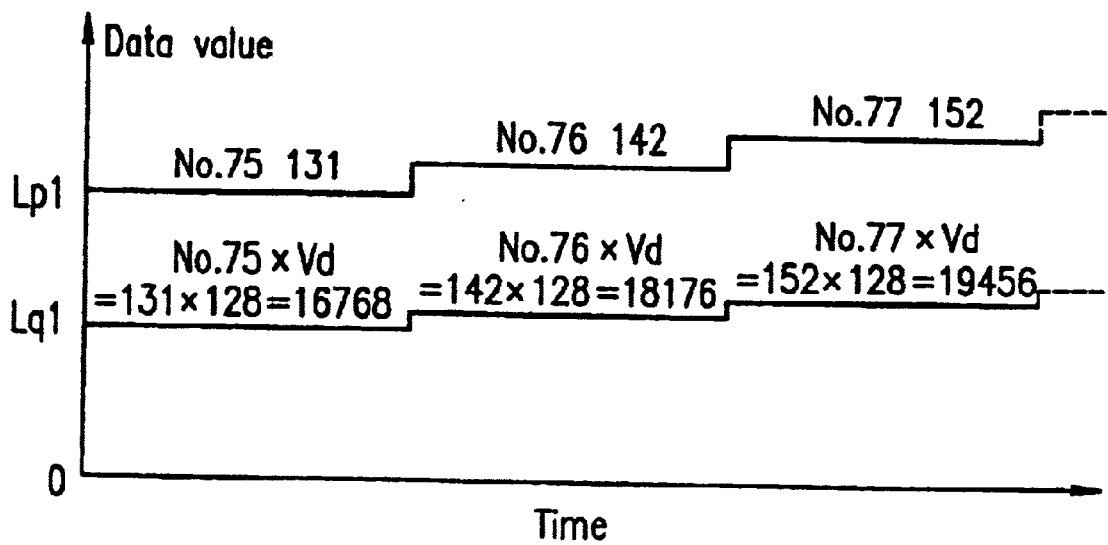
FIG. 4B is a graph illustrating output signals Lp1 and Lq1 immediately after the level sliced pulse signal is output from the hall amplifier/level slicing section 131.

FIG. 4B is a graph illustrating the output signals Lp1 and Lq1 immediately after the level sliced pulse signal is output from the hall amplifier/level slicing section 131.

In both FIGS. 4A and 4B, the voltage instruction value Vd of 128 (corresponding to 2.5 V) is output from the control section 139.

When the level sliced pulse signal is output from the hall amplifier/level slicing section 131 to the sine wave table storage section 133, the sine wave table storage section 133 sequentially reads the L system values from data number 75 and outputs the values as the output signals Lp1. The output signals Lp1 have values of 131, 142, 152, . . . in the order of being read. The multiplier 134 multiplies the voltage instruction value Vd of 128 by each value of the output signals Lp1 so as to generate the output signals Lq1. The output signals Lq1 have values of 16768, 18176, 19456, . . . .

Figure 4C:
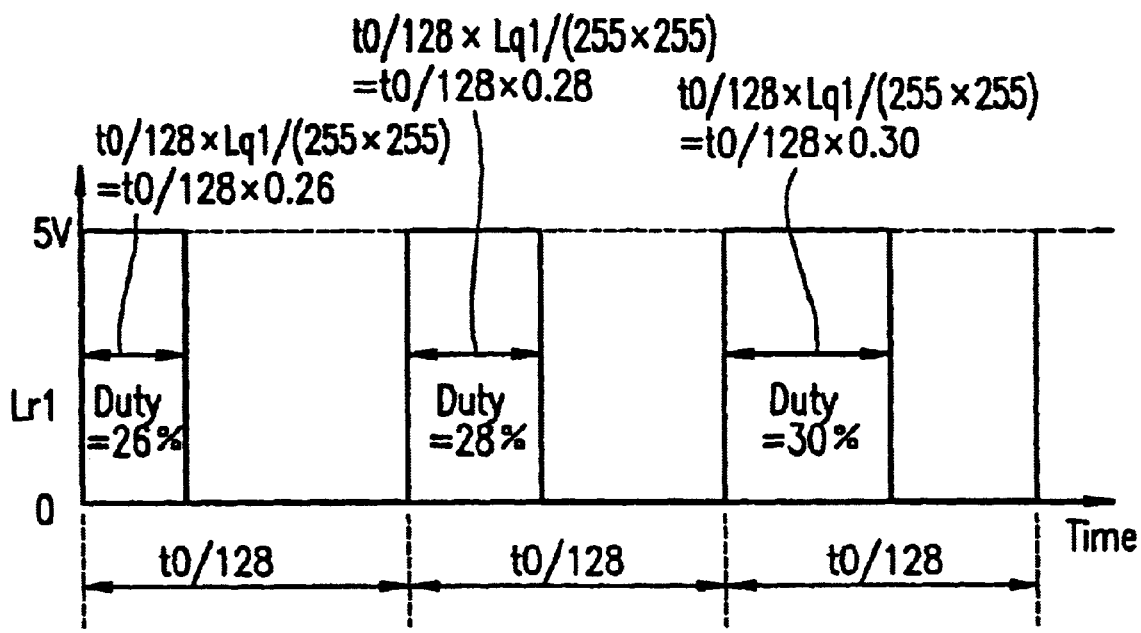
FIG. 4C is a graph illustrating output signals Lr1 generated based on the output signals Lq1 shown in FIG. 4B.

FIG. 4C is a graph illustrating the output signals Lr1 generated based on the output signals Lq1. The Data-Duty conversion section 135 generates signals having duty ratios of the output signals Hq1, Lq1, Hq2, Lq2, Hq3 and Lq3 with respect to the maximum signal value of 255×255=65025. The generated output signals are output as the output signals Lr1.

Specifically, the output signals Lr1 are output as pulse signals each having a pulse width corresponding to the value obtained by multiplying the duty ratio by t0/128 (the time period in which the data is read from the sine wave table storage section 133). The pulse signals have only two values of 0 V and 5 V. The output signals Hr1, Hr2, Lr2, Hr3 and Lr3 are generated in a similar manner.

The driving circuit 136 generates the output signals H1, L1, H2, L2, H3 and L3 based on the output signals Hr1, Lr1, Hr2, Lr2, Hr3 and Lr3. The driving circuit 136 controls the six switching elements HA1, HA2, HA3, LA1, LA2 and LA3.

The output signals H1, L1, H2, L2, H3 and L3 have only two values. The driving circuit 136 outputs the three signals L1, L2 and L3 respectively to the lower switching elements LA1, LA2 and LA3, and outputs three signals H1, H2 and H3 respectively to the upper switching elements HA1, HA2 and HA3.

The driving circuit 136 turns ON or OFF the lower switching elements LA1, LA2 and LA3 and the upper switching elements HA1, HA2 and HA3 so as to control the driving current flowing to each of the three-phase coils 114a, 114b and 114c of the stator coil section 114. The application of the output signal H1 to the upper switching element HA1 and the application of the output signal L1 to the lower switching element LA1 are performed alternately. Similarly, the application of the output signal H2 to the upper switching element HA2 and the application of the output signal L2 to the lower switching element LA2 are performed alternately, and the application of the output signal H3 to the upper switching element HA3 and the application of the output signal L3 to the lower switching element LA3 are performed alternately. Therefore, the coils 114a, 114b and 114c of the stator coil section 114 are each applied to a continuous sine wave voltage as shown in FIG. 3C.

As described above, the driving section 130 controls so that a ratio between a time period in which each of the switching elements H1, L1, H2, L2, H3 and L3 of the switching section is in the ON state and a time period in which each of the switching elements H1, L1, H2, L2, H3 and L3 of the switching section is in the OFF state is variable. Therefore, the voltage applied to each of the three-phase coils 114a, 114b and 114c of the stator coil section 114 can be controlled.

Table 2 compares a conventional Y-connection three-phase brushless motor (motor A), a delta-connection three-phase brushless motor, according to the present invention, having the same space factor and the same number of turns as those of motor A (motor B), and a conventional Y-connection three-phase brushless motor having the same space factor as that of motor B and half the number of turns of motor B (motor C).

TABLE 2

|  | Motor A | Motor B | Motor C |
|---|---|---|---|
| Torque generated per unit current | 1 | 2/3 | 1/2 |
| DC resistance (inter-phase) | 1 | 1/3 | 1/4 |
| Torque generated per unit voltage | 1 | 2 | 2 |
| Counterelectromotive voltage | 1 | 1/2 | 1/2 |

Motor B and motor C have the same counterelectromotive voltage. Motor B has a larger DC (direct current) resistance than motor C and so causes a smaller amplitude of driving current to flow than motor C. However, motor B has a larger torque generated per unit current; namely, obtains a given torque per unit voltage with a smaller amplitude of current than motor C. In general, as the number of turns of a coil is reduced, the efficiency tends to be lowered. According to the present invention, however, a satisfactory torque is obtained without reducing the number of turns of coils as shown in Table 2.

3. Conditions Regarding the Resistance Value of the Brushless Motor 100

Hereinafter, a resistance value of the brushless motor 100 according to the present invention which is necessary for the brushless motor 100 to have superior characteristics than those of the conventional Y-connection three-phase brushless motor (motor A) will be found.

Generally, when a driving transistor is ON, the driving transistor has some resistance (internal resistance), and lines between the driving transistor and a motor have a resistance. In the case of a delta-connection brushless motor apparatus, the driving current is increased as shown in Table 2. Therefore, the resistances significantly influence the characteristics of the brushless motor apparatus. Especially, the starting torque is significantly reduced. As a result, when the transistor is driven in the state where the internal resistance of the transistor and the resistance of the lines between the driving transistor and the motor are relatively large, the starting torque of the delta-connection brushless motor apparatus may be undesirably lower than the starting torque of the conventional Y-connection brushless motor apparatus.

Here, it is assumed that the internal resistance of the switching section 140 in an ON state is r1, the resistance of lines between the switching section 140 and the brushless motor 110 is r2, and R1=r1+r2. Where the starting torque of the Y-connection brushless motor is Ty, expression (1) is generated.

$$Ty = K \cdot I \quad (1),$$

where I represents the driving current and K represents the torque constant.

Where the power supply has a voltage E, the driving current I is obtained by expression (2) where the first-phase coil has a DC resistance of R.

$$I = E/(2R+R1) \quad (2)$$

From expressions (1) and (2), the starting torque Ty generated where the power supply has a voltage E is obtained by expression (3).

$$Ty = K \cdot E/(2R+R1) \quad (3)$$

The starting torque Td of a delta-connection brushless motor is obtained by expression (4) based on Table 2.

$$Td = 2/3 \cdot K \cdot I \quad (4)$$

Where the power supply has a voltage E, the driving current I is obtained by expression (5).

$$I = E/(2/3 \cdot R + R1) = 3E/(2R+3R1) \quad (5)$$

From expressions (4) and (5), the starting torque Td generated where the power supply has a voltage E is obtained by expression (6).

$$Td = 2K \cdot E/(2R+3R1) \quad (6)$$

From expressions (3) and (6), R1 at which Ty=Td is obtained by expression (7).

$$R1 = 2R \quad (7)$$

Namely, in order to obtain the advantage of a delta connection, a driving circuit fulfilling expression (8) needs to be used.

$$r1+r2 < 2R \quad (8)$$

The value of R is generally as low as about 1 Ω, and the internal resistance r1 of the switching element in an ON state is usually about 1 Ω. Accordingly, the internal resistance r1 significantly influences the characteristics of the brushless motor. In a structure where the brushless motor and the switching element are located with a certain distance therebetween, the resistance r2 of the lines between the switching element and the brushless motor also significantly influences the characteristics of the brushless motor.

In the brushless motor apparatus 100 according to the present invention, r1+r2<2R where the internal resistance of the switching section 140 in an ON state is r1, the resistance of the lines between the switching section 140 and the brushless motor 110 is r2, and the DC resistance of each of the coils 114a, 114b and 114c is R.

Accordingly, in the brushless motor apparatus 100 according to the present invention, the substantial voltage drop caused in accordance with the relationship between r1+r2 and 2R is smaller than in the Y-connection three-phase brushless motor apparatus. Therefore, the driving current which can flow to each of the coils and thus the torque for a given driving current is increased.

In the brushless motor apparatus 100 according to the present invention, no power is consumed by the switching section 140 even when the driving current is controlled to be a value other than the maximum value for the purpose of controlling the speed or when the brushless motor 110 is driven by a sine wave or a trapezoidal wave. The ON resistance consumes power, but the power consumption and heat generation by the ON resistance can be restricted so as to be low.

In the brushless motor apparatus 100 according to the present invention, the brushless motor 110 is driven by a substantially complete sine wave current. Therefore, the noise generated during a driving operation can be suppressed to a very low value. Such a noise level is sufficient for audio-visual equipment where a noiseless driving operation is in great demand.

4. Use of a Read Start Position Varying Section

A stator coil has an inductance component. Therefore, when the rotation speed of a brushless motor is increased and thus the driving frequency is increased, the phase of the driving current is delayed and thus the torque generation efficiency is reduced. This causes inconveniences that, for example, a longer time is required to accelerate the rotation of the brushless motor, the driving current is increased, and the rotation speed is not increased sufficiently.

When the rotation speed is increased, phase control needs to be performed; i.e., the phase of the driving current is advanced with respect to the phase of the rotation angle of the rotor magnet. Such phase control provides the effects of, for example, shortening the time required for accelerating the rotation of the brushless motor, further decreasing the driving current, and increasing the maximum rotation speed.

The delay in the phase of the driving current is associated with the ratio of the inductance of the stator coil with respect to the DC resistance of the stator coil. As the ratio becomes higher, the delay becomes larger. A delta-connection motor generally has a larger number of turns than a Y-connection motor. The DC resistance of a stator coil is in proportion to the number of turns, whereas the inductance of the stator coil is in proportion to the square of the number of turns. Therefore, in the delta-connection motor, the ratio of the inductance of the stator coil with respect to the DC resistance of the stator coil is larger and thus the delay in the phase is larger than in the Y-connection motor.

Therefore, the advantage of driving the motor with the phase of the driving current in accordance with the rotation speed of the motor is more significant in the delta-connection motor than in the Y-connection motor. Such a manner of driving provides more noticeable advantages of using a delta-connection motor.

In order to perform the phase control, the control section 139 of the brushless motor apparatus 100 may include a read start position varying section 150 (FIG. 1).

The read start position varying section 150 included in the control section 139 operates as follows.

The rotation speed signal FG output from the pulse interval measurement section 132 is input to the read start position varying section 150. The read start position varying section 150 stores a table which shows the rotation speeds of the brushless motor 110 and the most appropriate read start position (data number in the table stored in the sine wave table storage section 133 shown in Table 1) for each rotation speed. The read start position varying section 150 outputs a signal representing the read start position corresponding to the rotation speed of the brushless motor 110 to the sine wave table storage section 133. Based on the signal, the sine wave table storage section 133 varies the read start position of the table.

For example, when the brushless motor 110 is just started, the most preferable start position of reading the signals is as described above with reference to Table 1; i.e., data number 75 for the signals Hp1 and Lp1, data number 117 for signals Hp2 and Lp2, and data number 33 for the signals Hp3 and Lp3. When the rotation speed of the brushless motor 110 is 1500 rpm, it is most preferable to start reading at a phase advanced by about 15 degrees with respect to the phase at the time of starting the brushless motor 110. When the rotation speed of the brushless motor 110 is 5000 rpm, it is most preferable to start reading at a phase advanced by about 30 degrees with respect to the phase at the time of starting the brushless motor 110.

In order to realize the above-mentioned relationship between the rotation speed of the brushless motor 110 and the phase, the sine wave table storage section 133 starts reading the data of the table from the following positions.

When the rotation speed of the brushless motor 110 is 1500 rpm, the start position of reading the signals Hp1 and Lp1 is data number 80 (Table 1), the start position of reading the signals Hp2 and Lp2 is data number 123, and the start position of reading the signals Hp3 and Lp3 is data number 37. Advancing the data number at which reading is started by about 5 to 6, or 5.33 on average, means advancing the phase by about 15 degrees (360×5.33/128). When the data number at which reading is started is advanced as described above and the sine values are read and output as output signals Hp1, Lp1, Hp2, Lp2, Hp3 and Lp3 from such a position, the brushless motor 110 can be driven with a phase advanced by 15 degrees, which is optimum for the rotation speed of 1500 rpm.

Similarly, when the rotation speed of the brushless motor 110 is 5000 rpm, the start position of reading the signals Hp1 and Lp1 is data number 85 (Table 1), the start position of reading the signals Hp2 and Lp2 is data number 0, and the start position of reading the signals Hp3 and Lp3 is data number 43. Advancing the data number at which reading is started by about 10 to 11, or 10.66 on average, means advancing the phase by about 30 degrees (360×10.66/128). When the data number at which reading is started is advanced as described above and the sine values are read and output as output signals Hp1, Lp1, Hp2, Lp2, Hp3 and Lp3 from such a position, the brushless motor 110 can be driven with a phase advanced by 30 degrees, which is optimum for the rotation speed of 5000 rpm.

The table stored in the read start position varying section 150 can be easily modified in accordance with the type of motor included in the brushless motor apparatus 100.

In the brushless motor apparatus 100 including the read start position varying section 150, the elements other than the brushless motor 110 (including the rotor magnet 112, the stator coil section 114 and the hall element 116) and the control section 139 (including the read start position varying section 150) are structured as one motor driving IC. The control section 139 including the read start position varying section 150 is structured as hardware of, for example, an optical disc driving apparatus. The table stored in the read start position varying section 150 is structured as, for example, a part of a mask ROM storing software for controlling the optical disc driving apparatus.

A Y-connection motor apparatus and a delta-connection motor apparatus having the same specifications other than the manner of connection were compared.

When the Y-connection motor was driven without phase control, the maximum rotation speed was 5787 rpm. When the Y-connection motor was driven with phase control, the maximum rotation speed was 6544 rpm, which is 11.3% higher than the value obtained without phase control.

When a delta-connection motor was driven without phase control, the maximum rotation speed was 5605 rpm. When the delta-connection motor was driven with phase control, the maximum rotation speed was 6812 rpm, which is 21.5% higher than the value obtained without phase control. The ratio of increase in the maximum rotation speed obtained by phase control was higher in the delta-connection motor than in the Y-connection motor. The maximum rotation speed itself obtained with phase control was higher in the delta-connection motor than in the Y-connection motor.

As can be appreciated, the phase control improves the characteristics more significantly in the delta-connection motor than in the Y-connection motor.

5. Change in the Position of the Hall Element 116

The hall element 116 may be located at a position at which the magnetic fluxes generated by two adjacent coils among the three-phase coils 114a, 114b and 114c counteract each other.

For example, the hall element 116 may be provided at a position at 60 degrees away from the first-phase coil 114a towards the second-phase coil 114b, i.e., at 60 degrees away from the second-phase coil 114b towards the first-phase coil 114a. At this position, the hall element 116 can detect only the magnetic flux generated by the rotor magnet 112. In this case, the hall element 116 does not detect the magnetic fluxes generated by the adjacent coils 114a and 114b and thus can restrict generation of noise which adversely influences the motor characteristics.

The above-described position of the hall element 116 is identical with the position of a hall element included in a Y-connection motor. Therefore, it is conceivable that a driving IC used in the existing Y-connection motor is used in the delta-connection motor with no structural change, despite the following slight inconveniences. When the driving IC used in the existing Y-connection motor is used in the delta-connection motor, the excitation switching timing is offset from the optimum value, and thus the inconveniences such as, for example, reduction in the torque efficiency and generation of unnecessary vibration are caused, for the following reasons. In the Y-connection motor and the delta-connection motor, the manner of current flowing to the coils in the stator coil section is different and the phase of the generated magnetic field is different.

In the brushless motor apparatus 100 including the read start position varying section 150, the rotation efficiency of the brushless motor 110 can be prevented from deteriorating by performing phase control for maintaining the difference between the phase of the sine wave current and the phase of the rotation angle of the rotor magnet 112 detected by the hall element 116 at a value appropriate for the driving of the delta-connection brushless motor 110. The difference may be variable in accordance with the rotation speed of the rotor magnet 112 instead of being maintained at a certain value. In the case where the difference is variable, the brushless motor 110 can be driven at a phase which is optimum for the rotation speed of the rotor magnet 112. In the case where the difference is maintained at a certain value, the difference between the optimum phase of the delta-connection motor and the Y-connection motor is corrected while preventing the magnetic flux generated by the stator coil section 140 from interfering with the hall element 116. Therefore, in this case also, the brushless motor 110 can be driven at a phase which is optimum for the rotation speed of the rotor magnet 112.

A delta-connection brushless motor apparatus according to the present invention has the relationship of $r1+r2<2R$ where r1 is the internal resistance of a switching section when it is in an ON state, r2 is the resistance of lines between the switching section and a brushless motor, and R is the DC resistance of each of three-phase coils.

By comparison, in a conventional Y-connection three-phase brushless motor apparatus, $r1'+r2'>2R'$ where r1' is the internal resistance of a switching section when it is in an ON state, r2' is the resistance of lines between the switching section and a brushless motor, and R' is the DC resistance of each of three-phase coils.

As can be appreciated, the brushless motor apparatus according to the present invention reduces the sum of the internal resistance of the switching element and the resistance of the lines between the switching section and a brushless motor (r1+r2). Accordingly, as compared to the conventional Y-connection three-phase brushless motor apparatus, the brushless motor apparatus according to the present invention reduces the driving voltage drop which is caused in accordance with the relationship of the sum of the internal resistance of the switching element and the resistance of the lines between the switching section and a brushless motor with respect to the DC resistance of the coils. The reduction in the driving voltage drop can increase the driving current flowing to each of the coils and also increase the torque per current unit. As a result, the delta-connection brushless motor apparatus according to the present invention have superior characteristics to those of the conventional Y-connection three-phase brushless motor apparatus.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A brushless motor apparatus, comprising:

a motor section including delta-connected three-phase coils;

a switching section electrically connected to the motor section by a line; and a driving section for controlling an ON state and an OFF state of the switching section so as to drive the motor section with a driving current;

wherein $r1+r2<2R$, where r1 is an internal resistance of the switching section in an ON state, r2 is a resistance of the line connecting the motor section and the switching section, and R is a direct current resistance of each of the three-phase coils, wherein the driving section comprises a read start position varying section for varying the phase of the driving current in accordance with the rotation speed of the motor.

2. A brushless motor apparatus according to claim 1, wherein the driving section controls a ratio between a time period in which the switching section is in the ON state and a time period in which the switching section is in the OFF state to be variable.

3. A brushless motor apparatus according to claim 1, wherein:

the motor section includes a rotor rotatable about an axis thereof, and the driving section controls the ON state and the OFF state of the switching section so that the switching section outputs a sine wave current in accordance with a rotation angle of the rotor.

4. A brushless motor apparatus according to claim 3, wherein:

the motor section further includes a magnetic flux detection section for detecting a magnetic flux generated by the rotor, and the magnetic flux detection section is provided at a position at which magnetic fluxes generated by two adjacent coils among the three-phase coils counteract each other.

5. A brushless motor apparatus according to claim 1, wherein the motor section and the switching section are integrally structured.

* * * * *